March 18, 1924.
F. H. LANDRUM ET AL
1,487,170
APPARATUS FOR STERILIZING FRUITS AND VEGETABLES AND SIMILAR PRODUCTS
Filed Feb. 21, 1917
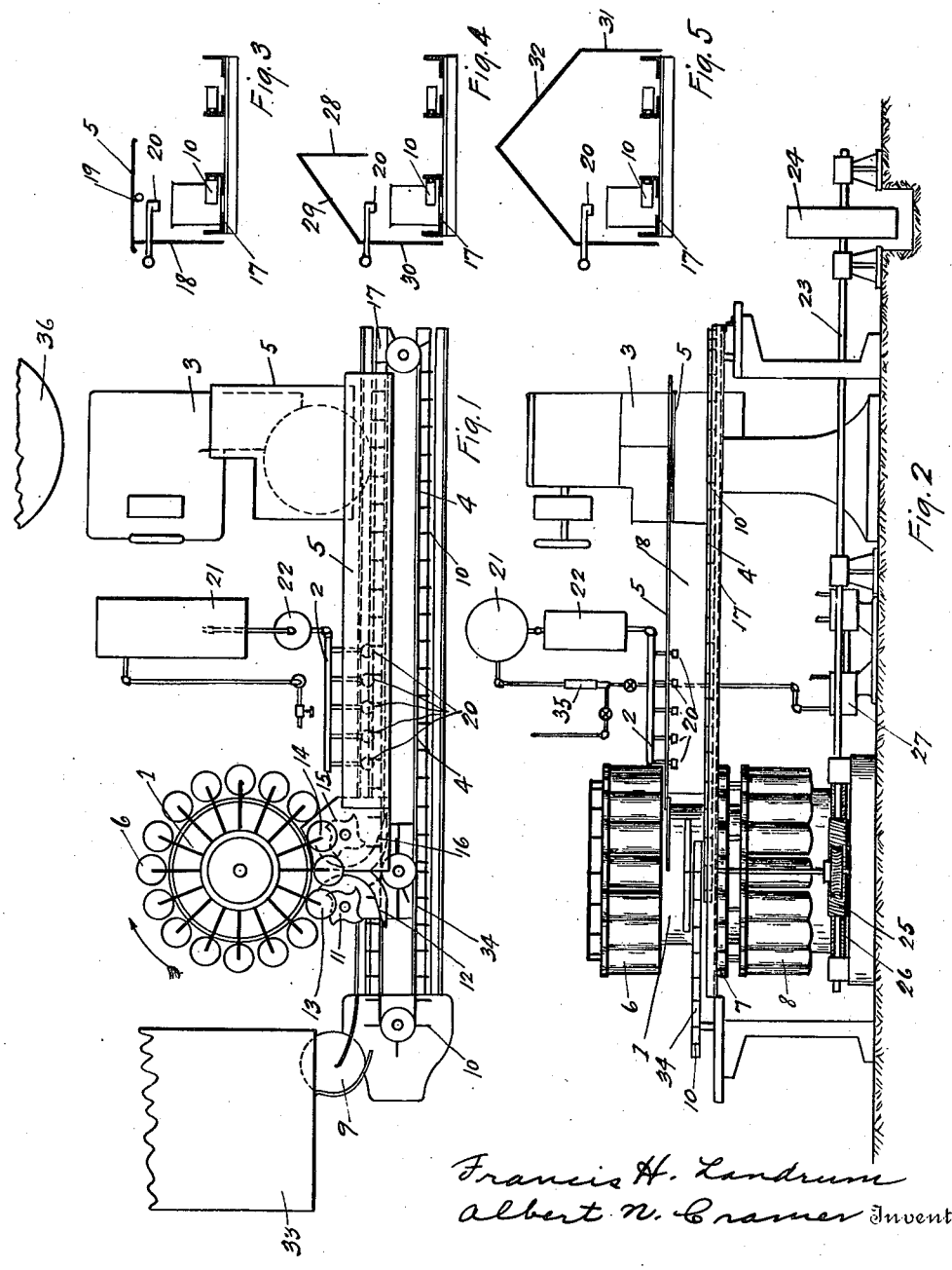
Francis H. Landrum
Albert N. Cramer Inventor
By Edwin P. Corbett
Attorney Patented Mar. 18, 1924.

1,487,170

UNITED STATES PATENT OFFICE.

FRANCIS H. LANDRUM AND ALBERT N. CRAMER, OF COLUMBUS, OHIO, ASSIGNORS TO THE WEDOIT COMPANY, OF COLUMBUS, OHIO.

APPARATUS FOR STERILIZING FRUITS AND VEGETABLES AND SIMILAR PRODUCTS.

Application filed February 21, 1917. Serial No. 149,989.

*To all whom it may concern:*

Be it known that we, FRANCIS H. LANDRUM and ALBERT N. CRAMER, citizens of the United States of America, residing at Columbus, in the county of Franklin and State of Ohio, have invented certain new and useful Improvements in Apparatus for Sterilizing Fruits and Vegetables and Similar Products, of which the following is a specification.

Our invention relates to an improved apparatus for sterilizing fruits and vegetables and similar products and is particularly directed to the provision of mechanism for treating the product in open vessels by the direct application of a sterilizing medium and the passing of such vessels, still open, through means for supplying a sterile liquid thereto and then to a means for closing such vessels with sterile closures and under sterile conditions.

Our invention contemplates a machine adapted to receive a stream of open vessels containing the product to be sterilized and operative to automatically handle and sterilize the products within such open vessels, then passing the vessels out of such machine. It further contemplates means for taking such issuing vessels and passing them beneath nozzles for supplying a sterile liquid to such vessels and then to a device which sterilizes closures and applies such sterile closures to these vessels containing the sterile product and the sterile liquid.

An important feature of our invention is the covering or housing which is positioned to preclude non-sterile particles from dropping into the traveling open vessels, and which is preferably heated to present a dry surface for evaporating moisture rising from the vessels and coming from the atmosphere.

The preferred embodiment of our invention is shown in the accompanying drawings wherein similar characters of reference indicate corresponding parts, and wherein—

Figure 1 is a plan view of our apparatus.

Figure 2 is a side elevation of the structure shown in Figure 1.

Figure 3 is a section taken through the apparatus for supplying the sterile liquid to the open vessels.

Figure 4 is a section similar to Figure 3 and showing a novel form of protective covering or housing.

Figure 5 is a section similar to Figures 3 and 4 and showing another modification of the protective covering or housing.

In the drawings, the sterilizing machine is designated 1, the apparatus for supplying the sterile liquid 2, and the closure sterilizing and applying mechanism 3. These elements are specifically described and claimed in applications to be filed herewith.

In conjunction with these units, we utilize two endless conveyors 4 and 34 and a cover-plate 5, the latter extending from the sterilizing machine 1, over the conveyor and the nozzles which supply the sterile liquid, and over the mechanism 3 which sterilizes and applies the vessel closures.

The sterilizing machine 1 is a turret-like apparatus and preferably comprises a series of receivers 6 open at their bottoms and designed to be closed by vertically reciprocable closer plates 7. Each closer plate 7 is raised or lowered by a piston working within a steam cylinder 8. The vessels with their upper ends open and containing the the product are fed through the passage-way 9 to the conveyor 34. A pusher finger 10 of which there are a number equally spaced upon the conveyors 4 and 34 assumes control of the vessel which has been fed in and carries it to a star wheel 11. This star wheel 11 then assumes control of the vessel and with the assistance of the vertical guide flange 12 moves such vessel into proper position upon a closer plate as at 13. These closer plates being mounted upon the turret-like member, are continually moved in a rotary path in the direction of the arrow in Figure 1. The means for effecting this movement will be described later. After the vessel has been delivered as at 13, it passes in the direction of the arrow in Figure 1 and shortly after it commences this travel, the receiver closer supporting it is elevated to enclose the open vessel within the receiver immediately above such closer plate. Especial mechanism is preferably provided within the receiver for directly applying a sterilizing medium to the product within the open vessel. The action is such that the product is completely sterilized by the time it approaches the position 14 in Figure 1. At this time, the star wheel 15 co-operating with the guide flange 16 assumes control of the open vessel and passes it out upon the guideway 17, where it is subjected to one of the pusher fingers 10 of the conveyor 4.

The open vessel is then under the control of the conveyor and it is also beneath the cover plate 5 which preferably has a vertical side wall 18 to obviate cross drafts and subjection of the interiors of the open vessels to contaminating influences. This cover plate 5 is also desirably heated by a heating pipe 19 with the result that rising moisture is vaporized. The vessel then passes along under the control of such conveyor until it reaches the first nozzle 20 of the apparatus for supplying sterile fluid thereto. As shown in application Serial No. 149,990 being filed herewith, the assumption of such position by the said open vessel automatically operates the controlling member for the nozzle and causes it to discharge the sterile fluid into such vessel. Preferably, a number of discharge nozzles are provided and each discharge nozzle is automatically operated by the vessel to contribute a predetermined portion of the sterile liquid to the vessel. As far as this application is concerned, however, the important fact is that the discharge nozzles are protected from above by a cover plate. They are also protected from the side draft by this cover. The nozzles are desirably supplied from a peculiar construction of reservoir 21 which is provided with a cooling device 22.

The vessels, still open, and now sufficiently supplied with sterile liquid, are carried by the conveyor 4 to the apparatus 3 which moves them and their closures relatively so as to bring them into proper position and then applies and seals such closures, it being understood that the closures have first been sterilized by the apparatus 3. As previously stated this apparatus is set forth in detail in application Serial No. 149,990.

The turret-like apparatus is preferably driven by a drive shaft 23 under the control of a pulley 24 and acting through the medium of a worm 25 upon a worm gear 26.

A pump 27 is shown for supplying liquid through a special liquid sterilizer 35 to its reservoir. It will be understood that there is also provided means for supplying a sterilizing medium to the machine 1 and for exhausting such sterilizing medium. Likewise, various mechanism is provided for handling the sterile liquid.

A modified structure of cover-plate is illustrated in Figure 4. In this view it will be apparent that the nozzles are protected from both sides inasmuch as there is provided a supplemental side plate 28 in conjunction with an upwardly inclined top plate 29 and a lower side plate 30.

In Figure 5 is shown a still further modification wherein the whole conveyor and the nozzles are completely covered by a casing 31 having an inverted V-shaped roof 32. A sloping roof has certain advantages resulting from the fact that the condensation will drain away from the open vessels. In order to be effectual when not heated, a sloping roof must be free of projections or knobs directly over the open vessels.

Under preferred conditions we utilize an exhaust box through which the above vessels containing the products are passed. This raises the temperature of these products preliminarily so that they are in a more receptive condition to treatment. The vessels leave this exhaust box 33, which may be of normal form, and pass to the passage way 9.

The combination as a whole is believed to be clearly novel with us, since it is thought that no one has ever hitherto contemplated the sterilization of a product in open vessels and the passing of such product for a considerable distance, still open, but beneath a protective cover-plate which does not contact with the vessels but which precludes the falling of any contaminating particles thereinto. In addition, we apply a sterile liquid under the protection of a cover-plate and particularly of a non-engaging cover-plate; we contemplate an application of sterile closures to vessels whose interiors and products have been previously sterilized. Particularly is this so when it is considered that our improvement provides a cover-plate for the machine which sterilizes the closures and applies and seals them to the open vessels.

It is very important to note that we provide apparatus for adding sterile liquids to sterile solids. This is particularly true when it is considered that our apparatus automatically handles open vessels, automatically supplies sterile liquids thereto and automatically closes such vessels.

A very important aspect of our apparatus arises from the fact that it comprises not only a main sterilizing apparatus and an apparatus for preliminarily heating the product, but it provides for the passage of the vessels after closure to a retort or exhaust box 36. Under certain conditions and with certain products, it may be desirable to pass the products in open vessels through the main portion of our apparatus, this usually requiring about ten seconds, and then to subject the closed vessels after such treatment to a short treatment in an exhaust box or retort 36. It has been found that a great saving of time and superiority of product result from this combined process and we have therefore applied for protection both on the process and the apparatus.

Having thus described our invention, what we claim is:

1. Sterilizing apparatus comprising means for protecting the open end of vessels containing sterile material, said means constructed to carry condensed vapors rising from the material away from the open end of the vessels.

2. Sterilizing apparatus comprising means for protecting the open ends of vessels containing sterile material, means for moving said vessels under said protective means, said first means being positioned to gather the condensed vapors rising from the material and constructed to carry such condensation away from the open end of the vessels, and constructed to permit uninterrupted view of the vessels.

In testimony whereof we hereby affix our signatures.

FRANCIS H. LANDRUM.
ALBERT N. CRAMER.